United States Patent
Fujimura et al.

(10) Patent No.: US 11,777,589 B2
(45) Date of Patent: Oct. 3, 2023

(54) SATELLITE RECEIVER AND SATELLITE COMMUNICATION SYSTEM

(71) Applicant: Mitsubishi Electric Corporation, Tokyo (JP)

(72) Inventors: Akinori Fujimura, Tokyo (JP); Hitomi Ono, Tokyo (JP); Yoshio Inasawa, Tokyo (JP); Masaaki Kusano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/787,939

(22) PCT Filed: Jan. 27, 2020

(86) PCT No.: PCT/JP2020/002765
§ 371 (c)(1),
(2) Date: Jun. 22, 2022

(87) PCT Pub. No.: WO2021/152660
PCT Pub. Date: Aug. 5, 2021

(65) Prior Publication Data
US 2023/0022974 A1    Jan. 26, 2023

(51) Int. Cl.
*H04B 7/08* (2006.01)
*H04B 7/185* (2006.01)

(52) U.S. Cl.
CPC ......... *H04B 7/0885* (2013.01); *H04B 7/1851* (2013.01)

(58) Field of Classification Search
None
See application file for complete search history.

(56) References Cited

U.S. PATENT DOCUMENTS 10,284,308 B1    5/2019 Elwailly et al.
2010/0164782 A1*  7/2010 Saha .................. H01Q 3/267
                                                    342/174

(Continued)

FOREIGN PATENT DOCUMENTS

JP    2012-514407 A    6/2012
JP    2018-19384 A     2/2018

(Continued)

OTHER PUBLICATIONS

Extended European search report dated Dec. 5, 2022, in corresponding European patent Application No. 20917084.4, 11 pages.

(Continued)

*Primary Examiner* — Shripal K Khajuria
(74) *Attorney, Agent, or Firm* — XSENSUS LLP (57) ABSTRACT

A satellite receiver includes: demultiplexing units each demultiplexing, into subchannel signals of a predetermined band, a digital reception signal obtained by converting a calibration signal received by a corresponding one of receiving antenna elements into a digital signal; excitation coefficient multiplication units multiplying the subchannel signals by an excitation coefficient; a complex adder adding the subchannel signals multiplied by the excitation coefficient together for each subchannel signal of the same band; a correlation detection unit calculating, with the use of one demultiplexing unit as a reference demultiplexing unit, a cross-correlation value for each subchannel signal output from each demultiplexing unit different from the reference demultiplexing unit with respect to a subchannel signal of a same band output from the reference demultiplexing unit; and an excitation coefficient generation unit generating a corrected excitation coefficient based on a cross-correlation value and an excitation coefficient created in advance.

16 Claims, 5 Drawing Sheets

(56) References Cited

U.S. PATENT DOCUMENTS

| | | | | |
|---|---|---|---|---|
| 2013/0300601 | A1* | 11/2013 | Koishi | H04B 7/18519 |
| | | | | 342/358 |
| 2017/0082753 | A1* | 3/2017 | Chang | H01Q 3/267 |
| 2019/0058530 | A1 | 2/2019 | Rainish et al. | |
| 2021/0119694 | A1 | 4/2021 | Ono et al. | |

FOREIGN PATENT DOCUMENTS

| | | |
|---|---|---|
| WO | 2017/153984 A1 | 9/2017 |
| WO | 2019/155952 A1 | 8/2019 |

OTHER PUBLICATIONS

International Search Report and Written Opinion dated Mar. 31, 2020, received for PCT Application PCT/JP2020/002765, filed on Jan. 27, 2020, 10 pages including English Translation.

Ono et al., "The Initial Study of Calibrating Receiving Digital Beam Forming in Engineering Test Satellite-9", Advances in Communications Satellite Systems. Proceedings of the 37th International Communications Satellite Systems Conference (ICSSC-2019), Oct. 29, 2019, pp. 1-4.

Thomas et al., "Methods for Wideband Beamforming in Active Antennas", 39th ESA Antenna Workshop on Innovative Antenna Systems and Technologies for Future Space Missions, Oct. 2-5, 2018, 7 pages.

\* cited by examiner

SATELLITE RECEIVER AND SATELLITE COMMUNICATION SYSTEM

CROSS-REFERENCE TO RELATED APPLICATION

The present application is based on PCT filing PCT/JP2020/002765, filed Jan. 27, 2020, the entire contents of which is incorporated herein by reference.

FIELD

The present disclosure relates to a satellite receiver and a satellite communication system that receive signals using an array antenna.

BACKGROUND

With an increase in communication capacity, a relay satellite system that flexibly controls communication traffic is required. Regarding control of area flexibility of communication traffic in a relay satellite system, there is a technology called beam forming for forming transmission and reception beams by controlling excitation coefficients of a plurality of antennas, that is, amplitudes and phases thereof. Examples of a beam forming method include microwave beam forming (MBF) using a phase shifter for microwaves, and digital beam forming (DBF) that controls excitation coefficients by digital signal processes. Since the digital beam forming enables integration as compared with the microwave beam forming, the number of beams can be increased.

For example, in a satellite relay device described in Patent Literature 1, the following means is described as a method of digital beam forming; each of signals received by receiving antenna elements is subjected to frequency division and multiplied by a weighting coefficient in an excitation coefficient multiplication unit, and reception signals are combined to form a beam. With respect to a plurality of signal transmitters on the ground, the satellite relay device automatically calculates, on the relay device side, excitation coefficients that maximize reception efficiency, and multiplies reception signals by the excitation coefficients, thereby forming a beam.

In such digital beam forming, it is important to reduce a gain difference, a delay difference, and a phase difference between receiving antenna element systems.

CITATION LIST

Patent Literature

Patent Literature 1: WO2019/155952

SUMMARY

Technical Problem

In general, when establishing communication by beam forming using a plurality of feed elements, it is necessary to reduce an amplitude difference, a phase error, and a delay difference between the feed elements caused by individual differences between components and temperature fluctuations. The amplitude difference and the phase error between the feed elements cause a shape change from an ideal beam shape when an excitation coefficient is determined and antenna gain degradation. In addition, the delay difference between the feed elements causes intersymbol interference when combining reception signals in the elements. In particular, in a case of achieving a beam for establishing broadband communication, the influence of the delay difference is increased, which results in deterioration in communication quality.

In the invention described in Patent Literature 1, optimum excitation coefficients can be automatically set for a plurality of ground transmission stations (ground terminals) by the satellite relay device, but on the other hand, it is not possible to separate a gain difference, a delay difference, and a phase difference between element systems based on a signal arrival direction of each ground terminal from the above-described errors between element systems, that is, an amplitude difference, a phase error, and a delay difference between feed elements generated inside the satellite relay device. That is, in the invention described in Patent Literature 1, a beam formed by beam forming can be optimized for each of the ground terminals, but any intended beam cannot be formed independently of the positions of the ground terminals. In particular, when the number of ground terminals is large, there may be a case where a plurality of ground terminals are covered by the same beam. In such a case, there arises a need to make, by a communication control station on the ground or the like, a plan for an area to be covered from information regarding, for example, arrangement of the ground terminals, and to form a beam in accordance with the plan.

The present disclosure has been made in view of the above, and an object thereof is to obtain a satellite receiver capable of improving communication efficiency by calibrating errors between element systems generated inside a device, specifically, a gain error, a delay error, and a phase error.

Solution to Problem

In order to solve the above-described problems and achieve the object, a satellite receiver includes: N demultiplexing units to each demultiplex, into a plurality of subchannel signals of a predetermined band, a digital reception signal obtained by converting a calibration signal received by a corresponding one of N receiving antenna elements into a digital signal; and N excitation coefficient multiplication units to multiply each of the plurality of subchannel signals by an excitation coefficient. In addition, the satellite receiver includes: a complex adder to add the plurality of subchannel signals that are multiplied by the excitation coefficient together for each subchannel signal of the same band; and a correlation detection unit to, with the use of one demultiplexing unit among the N demultiplexing units as a reference demultiplexing unit, calculate a cross-correlation value for each subchannel signal output from each demultiplexing unit different from the reference demultiplexing unit with respect to a subchannel signal of the same band output from the reference demultiplexing unit. Furthermore, the satellite receiver includes an excitation coefficient generation unit to generate a corrected excitation coefficient that is an excitation coefficient by which the excitation coefficient multiplication units multiply the subchannel signals on the basis of a cross-correlation value calculated by the correlation detection unit and an excitation coefficient created in advance to form a desired reception beam, and the N is an integer of 2 or more.

Advantageous Effects of Invention

A satellite receiver according to the present disclosure achieves an effect that it is possible to improve communication efficiency by calibrating errors between element systems generated inside a device.

DESCRIPTION OF EMBODIMENTS

Hereinafter, a satellite receiver and a satellite communication system according to each embodiment of the present disclosure will be described in detail with reference to the drawings. The disclosure is not limited to the embodiments.

First Embodiment

Figure 1:
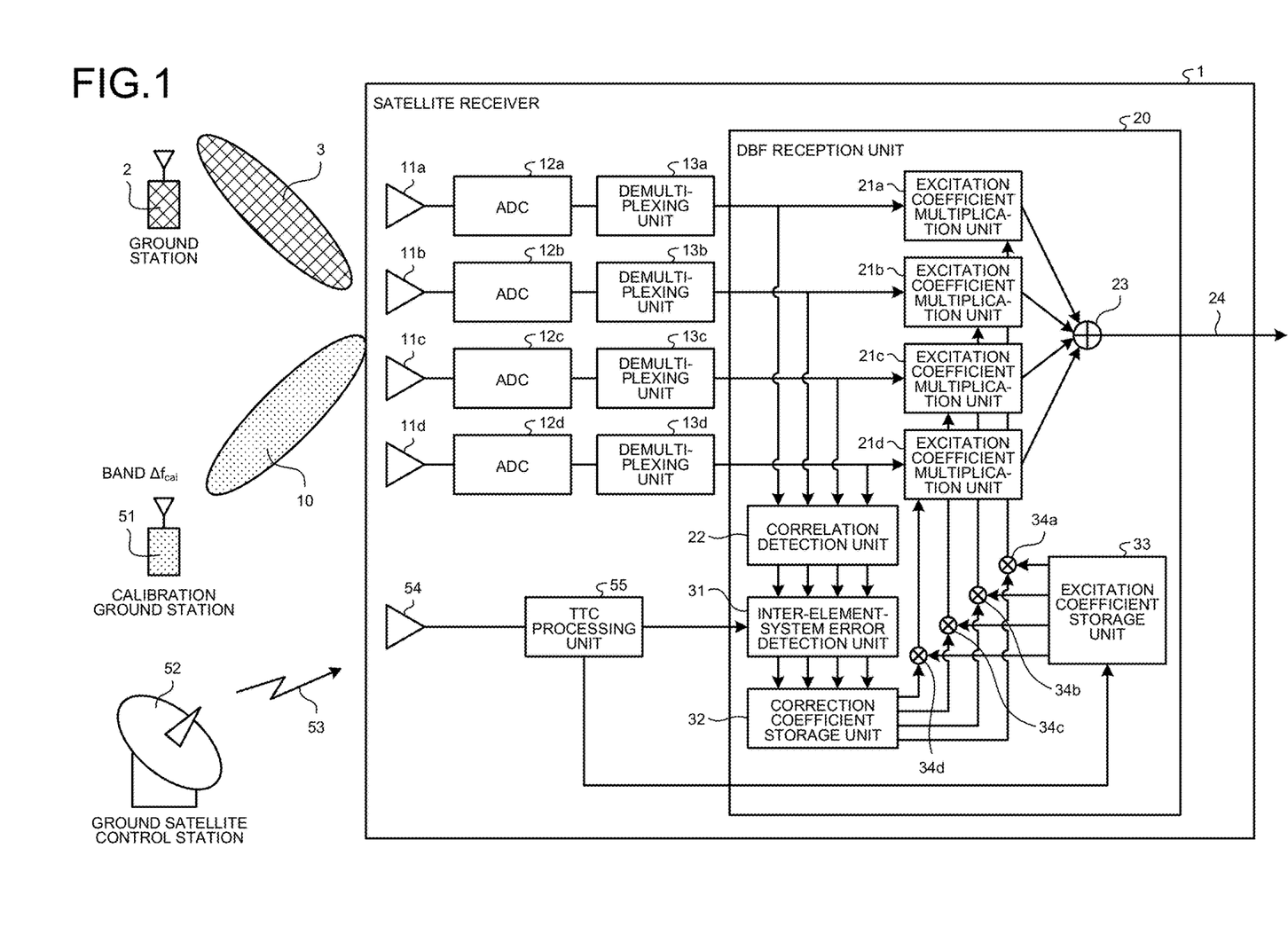
FIG. 1 is a diagram illustrating an example configuration of a satellite receiver according to a first embodiment.

FIG. 1 is a diagram illustrating an example configuration of a satellite receiver according to a first embodiment. A satellite receiver 1 according to the first embodiment includes receiving antenna elements 11a to 11d, analog-to-digital converters (hereinafter referred to as ADCs) 12a to 12d, demultiplexing units 13a to 13d, a DBF reception unit 20, a tracking telemetry & command (TTC) transmitting/receiving antenna 54, and a TTC processing unit 55. The DBF reception unit 20 includes excitation coefficient multiplication units 21a to 21d, a correlation detection unit 22, a complex adder 23, an inter-element-system error detection unit 31, a correction coefficient storage unit 32, an excitation coefficient storage unit 33, and complex multipliers 34a to 34d. The satellite receiver 1 is installed, for example, on a satellite to constitute a satellite communication system. Note that, in the satellite receiver 1 illustrated in FIG. 1, the number of element systems including the receiving antenna elements 11x, the ADCs 12x, and the demultiplexing units 13x (x=a to d) is four, but the number of element systems is not limited to four.

An object of the satellite receiver 1 is to correct gain, delay, and phase errors between element systems of N elements (N=4 in the example illustrated in FIG. 1), and to obtain desired reception characteristics regardless of errors between the element systems with respect to an actual communication signal 3 received from a ground station 2. The satellite receiver 1 corrects the gain, delay, and phase errors between the element systems using a calibration signal 10 of a band Δfcal transmitted from a calibration ground station 51.

In the satellite receiver 1, the receiving antenna elements 11x each receive the actual communication signal 3 from the ground station 2 and the calibration signal 10 from the calibration ground station 51. The ADCs 12x digitally convert reception signals input from the receiving antenna elements 11x. The demultiplexing units 13x demultiplex digital reception signals, which are the digitally-converted signals, for each predetermined frequency band. The excitation coefficient multiplication units 21x multiply the reception signals that have been demultiplexed by the demultiplexing units 13x by corrected excitation coefficients generated by the complex multipliers 34x to be described later. The complex adder 23 performs vector-synthesis of the reception signals after multiplication by the corrected excitation coefficients each output from one of the plurality of excitation coefficient multiplication units 21x to form a reception beam. The correlation detection unit 22 performs correlation detection of reception signals between the element systems. The inter-element-system error detection unit 31 detects errors between the element systems on the basis of results of the correlation detection performed by the correlation detection unit 22 and calculates a correction coefficient for correcting the errors between the element systems. The correction coefficient storage unit 32 stores the correction coefficient calculated by the inter-element-system error detection unit 31. The excitation coefficient storage unit 33 stores an excitation coefficient for forming a desired reception beam. The complex multipliers 34x each multiply the correction coefficient for the errors between the element systems stored in the correction coefficient storage unit 32 and the reception beam-formation excitation coefficient stored in the excitation coefficient storage unit 33 together to generate a corrected excitation coefficient. The TTC transmitting/receiving antenna 54 receives a command signal 53 from a ground satellite control station 52. The TTC processing unit 55 delivers the command signal 53 input from the TTC transmitting/receiving antenna 54 to the inter-element-system error detection unit 31 and the excitation coefficient storage unit 33.

The satellite receiver 1 having the above configuration receives the actual communication signal 3 from the ground station 2 on the basis of reception characteristics for a reception beam determined by the excitation coefficient and the reception characteristics of the receiving antenna elements 11a to 11d, and outputs the actual communication signal 3 as a signal 24. In the satellite receiver 1, the inter-element-system error detection unit 31 and the complex multipliers 34a to 34d constitute an excitation coefficient generation unit.

Next, an operation of the satellite receiver 1 will be described in detail. Note that, in the present embodiment, the number of receiving antenna elements may be described as N for convenience. N is an integer of 2 or more.

First, as a basic operation of the satellite receiver 1, the actual communication signals 3 received by the receiving antenna elements 11a to 11d are digitally converted by the ADCs 12a to 12d. A sampling frequency fs of the ADCs is set to a value that satisfies the sampling theorem for the reception signals. In a case where this is not satisfied due to the original frequency, the condition is satisfied by performing intermediate frequency (IF) conversion or the like. Furthermore, the ADCs 12a to 12d each perform a filtering process as necessary to remove aliasing.

The demultiplexing units 13a to 13d each demultiplex the digitally-converted signal into subchannels of a band Δfch to generate subchannel signals. The demultiplexing units 13a to 13d each have a function of performing quadrature detection of the digitally-converted reception signal and analyzing a spectrum thereof. The demultiplexing units 13a to 13d each perform spectral resolution on a signal with resolution corresponding to the band width Δfch out of the total band Δf. Therefore, the number K of subchannels after spectral resolution is K=Δf/Δfch. In addition, by the quadrature detection, decomposition into orthogonal components of an I signal (complex number real part) and a Q signal (complex number imaginary part) is performed, and the subchannel signals are output. Hereinafter, each subchannel signal is treated as a complex number.

All subchannel (I,Q) signals output from the demultiplexing units 13*a* to 13*d* are input to the DBF reception unit 20. Here, in the example illustrated in FIG. 1, one DBF reception unit 20 is provided, and this assumes a case where one reception beam for communication is formed. In a case where the number of reception beams for communication increases, it is only required to prepare another DBF reception unit 20 depending on the number of reception beams to be formed. If frequency bands allocated to reception beams do not overlap, one DBF reception unit 20 may be used for a plurality of reception beams.

A basic function of the DBF reception unit 20 is to control reception characteristics of the entire array antenna by multiplying the signals demultiplexed into the subchannels of the respective elements by excitation coefficients of complex numbers by the excitation coefficient multiplication units 21*a* to 21*d* and then adding the signals of all the elements together for each of the subchannels by the complex adder 23. The signal 24 output from the complex adder 23 is transmitted as an actual communication signal to another ground station (not illustrated) different from the ground station 2 via a satellite transmitter (not illustrated). Alternatively, the signal 24 is transmitted to the ground station via the satellite transmitter after frequency switching between the subchannels, that is, a channelization operation is performed.

The excitation coefficients multiplied in the excitation coefficient multiplication units 21*a* to 21*d* are transmitted to the satellite on which the satellite receiver 1 is installed from the ground satellite control station 52 via the command signal 53, for example. The excitation coefficients transmitted from the ground satellite control station 52 are stored in the excitation coefficient storage unit 33 via the TTC transmitting/receiving antenna 54 and the TTC processing unit 55 in the satellite receiver 1, and are delivered to the excitation coefficient multiplication units 21*a* to 21*d*. The TTC transmitting/receiving antenna 54 transmits and receives the command signal 53 and a telemetry signal (not illustrated), and the TTC processing unit 55 performs deliver control of information on the excitation coefficients and the like transmitted with the command signal 53 to each functional unit in the DBF reception unit 20, and collects the telemetry signal from each functional unit.

If there is no error between the element systems inside the satellite receiver 1, desired reception characteristics depending on an excitation coefficient set via the ground satellite control station 52 are obtained for the entire array antenna. However, in practice, a gain difference, a delay difference, and a phase difference occur for each of the element systems from the receiving antenna elements 11*a* to 11*d* to the demultiplexing units 13*a* to 13*d*. The differences for each element system are caused by temperature fluctuations in a transmission path such as a waveguide and a coaxial cable, a difference in path length at the time of design, a clock shift of the ADCs, and the like. Furthermore, in the satellite receiver 1, an amplifier for amplifying a signal level and a frequency converter for performing frequency conversion may be used, and it is difficult to completely match characteristics thereof with each other between the element systems. As described above, between the plurality of element systems included in the satellite receiver 1, there is an error between element systems which is an error based on characteristics of hardware constituting the element systems.

Therefore, the satellite receiver 1 includes a functional unit for detecting and correcting an error between the element systems inside the DBF reception unit 20. The functional unit performs a signal process on the basis of the calibration signal 10 transmitted from the calibration ground station 51, and performs detection of an error and calculation of a correction coefficient.

The band of the calibration signal 10 transmitted from the calibration ground station 51 is defined as $\Delta$fcal. The band $\Delta$fcal is desirably the same as the band $\Delta$f that can be processed by the demultiplexing units 13*a* to 13*d* and the excitation coefficient multiplication units 21*a* to 21*d*. This is because the band $\Delta$fcal of the calibration signal 10 becomes a band in which calibration can be guaranteed as the satellite receiver 1 after calibration. As the calibration ground station 51, a portable very small aperture terminal (VSAT) and the like are exemplified. In order to avoid interference with a communication signal, calibration using the calibration signal 10 is performed at a time when communication via the actual communication signal 3 is not performed.

The calibration signal 10 is to be received by the receiving antenna elements 11*a* to 11*d*. Since the calibration signal 10 is spatially distributed, the same signal is to be received by all the receiving antenna elements 11*a* to 11*d*. However, the power and the phase of the calibration signal received by each of the receiving antenna elements 11*a* to 11*d* at that time vary depending on the reception characteristics of each of the receiving antenna elements 11*a* to 11*d*. For example, when a reception gain of a receiving antenna element is small with respect to a location of the calibration ground station 51, a signal is hardly received by the receiving antenna element. In calibration between the element systems, it is necessary to input a calibration signal to at least two elements. Therefore, the calibration ground station 51 is arranged, among the ground locations covered by radiation patterns of the receiving antenna elements 11*a* to 11*d*, at a location where a sufficient gain can be obtained, that is, a location where a gain equal to or larger than a predetermined value can be obtained, with respect to at least two elements.

The calibration signal 10 is converted into demultiplexed subchannel signals similarly to the actual communication signal 3 via the ADCs 12*a* to 12*d* and the demultiplexing units 13*a* to 13*d*.

The subchannel signals of the respective element systems demultiplexed by the demultiplexing units 13*a* to 13*d* are extracted and input to the correlation detection unit 22. The correlation detection unit 22 calculates a correlation vector regarding the reception signals of the respective element systems for each of the subchannels. In the calculation of the correlation vector, by correlating a reception signal of an element system with the highest reception power with a reception signal of another element system, a correlation vector using the element system with the highest reception power as reference can be obtained. That is, one reference is determined, and correlation vectors of the reception signals of all the other element systems are obtained with respect to the reception signal of the element system as reference. On the basis of the correlation vectors obtained by the correlation detection unit 22, the inter-element-system error detection unit 31 calculates a correction coefficient of each of the subchannels of the respective element systems.

The correction coefficients calculated by the inter-element-system error detection unit 31 are stored in the correction coefficient storage unit 32, and are multiplied by the beam-formation excitation coefficient stored in the excitation coefficient storage unit 33 by the complex multipliers 34*a* to 34*d*. Consequently, corrected excitation coefficients in which errors between the element systems generated inside the satellite receiver 1 have been corrected are calculated and set for the respective element systems and the respective subchannels by the excitation coefficient multiplication units 21a to 21d. As a result, it becomes possible to perform beam formation without being affected by errors between the element systems generated inside the satellite receiver 1. Note that the complex multipliers 34a to 34d constitute a multiplication unit that generates the corrected excitation coefficients.

Here, calculation of a correction coefficient based on a cross-correlation value of complex numbers performed by the inter-element-system error detection unit 31 will be described. First, a signal of a subchannel k of a receiving antenna element n after demultiplexing can be described as the following formula (1). Note that, in the following description, the receiving antenna element may be simply referred to as an "element" for convenience of description.

[Formula 1]

$$X_n[k]=I_n[k]+jQ_n[k]=A_n e^{j\Theta_n} \quad (1)$$

In formula (1), $I_n$ and $Q_n$ are a real part and an imaginary part of a complex number $X_n$, respectively, $A_n$ is an amplitude of the complex number $X_n$, and $\theta_n$ is an argument of the complex number $X_n$. Now, with the use of the element n as reference, an element m having a gain difference, a delay difference, and a phase difference is considered, and a signal of each subchannel k can be described as the following formula (2).

[Formula 2]

$$X_m[k]=I_m[k]+jQ_m[k]=A_m\Delta_{mn}e^{j(\Theta_m+\delta_{mn})} \quad (2)$$

Here, with the use of the element n as reference, an amplitude error due to a gain difference between the element systems inside the satellite receiver 1 is denoted by $\Delta_{mn}$, and a phase error due to a delay difference and a phase difference between the element systems is denoted by $\delta_{mn}$.

When an excitation coefficient for the subchannel k of the element m is denoted by $G_m e^{j\psi_m}$, an output after multiplexing of N elements by the complex adder 23 can be described by the following formula (3).

[Formula 3]

$$Y_{err}=\Sigma_m^N G_m A_m \Delta_{mn} e^{j\psi_m} e^{j(\Theta_m+\delta_{mn})} \quad (3)$$

In an ideal case where there is no error between the element systems, the following formula (4) is obtained, and it can be seen that the errors between the element systems affect the reception characteristics.

[Formula 4]

$$Y_{nom}=\Sigma_m^N G_m A_m e^{j\psi_m} e^{j\Theta_m} \quad (4)$$

Now, when the cross-correlation of these complex numbers is calculated on the basis of formulas (1) and (2), the cross-correlation can be described as the following formula (5).

[Formula 5]

$$X_m X_n^* = A_m A_n \Delta_{mn} e^{j(\Theta_m+\delta_{mn}-\Theta_n)} \quad (5)$$

$$= A_m A_n \Delta_{mn} e^{j(\Theta_m-\Theta_n)} e^{j\delta_{mn}}$$

$$= A_m A_n \exp\{2\pi j(\tau_m-\tau_n)k\Delta f_{ch}+j(\phi_m-\phi_n)\}\times \Delta_{mn}\exp(2\pi j\tau_{mn}k\Delta f_{ch}+j\phi_{mn})$$

In a case where the number of elements is N, n takes any one of values of 1 to N, and m takes all values of 1 to N. In a case of m=n, formula (5) is autocorrelated. Here, $A_m$ and $A_n$, $\tau_m$ and $\tau_n$, as well as $\phi_m$ and $\phi_n$ are amplitude, delay, and phase determined by the reception characteristics of respective receiving antenna elements m with respect to the position of the calibration ground station 51, respectively, and are set as in the following formula (6).

[Formula 6]

$$A_m A_n e^{j(\Theta_m-\Theta_n)} \quad (6)$$

$$= A_m \exp\{j(2\pi\tau_m k\Delta f_{ch}+\phi_m)\}\times A_n \exp\{-j(2\pi\tau_n k\Delta f_{ch}+\phi_n)\}$$

$$= A_m A_n \exp\{2\pi j(\tau_m-\tau_n)k\Delta f_{ch}+j(\phi_m-\phi_n)\}$$

An effect that a time delay in a time domain appears as a phase term in a frequency domain after demultiplexing is based on the relationship represented by the following formula (7). In formula (7), reference character "F" written above the arrow represents Fourier transform.

[Formula 7]

$$x(t-k) \xrightarrow{F} \exp(-j2\pi f\tau)F[x(t)] \quad (7)$$

In addition, the delay difference and the phase difference can be converted via a carrier wavelength, but are separately described here for organization, phase rotation of $2\pi$ or more is regarded as the delay difference, and the phase difference is assumed to have a value in a range of 0 to $2\pi$.

Furthermore, in formula (5), the second term includes a complex number based on errors between the element systems generated inside the satellite receiver 1, which is represented by the following formula (8).

[Formula 8]

$$\Delta_{mn}e^{j\delta_{mn}}=\Delta_{mn}\exp(2\pi j\tau_{mn}k\Delta f_{ch}+j\phi_{mn}) \quad (8)$$

An amplitude error due to a gain difference between the element systems inside the satellite receiver 1 is denoted by $\Delta_{mn}$, a delay error between the element systems is denoted by $\tau_{mn}$, and a phase error between the element systems is denoted by $\phi_{mn}$. Therefore, if the complex number represented by formula (8) can be calculated, errors between the element systems generated inside the satellite receiver 1 can be detected, and a reciprocal thereof serves as a correction coefficient.

On the basis of the above discussion, detection of an error between the element systems and calculation of a correction coefficient will be described.

First, the correlation detection unit 22 calculates cross-correlation and autocorrelation using the element n as reference for all subchannels of all elements. In a case where the number of elements is N and the number of subchannels is K, the correlation detection unit 22 calculates N×K correlation values (cross-correlation and autocorrelation), and the N×K correlation values are output to the inter-element-system error detection unit 31.

Next, the inter-element-system error detection unit 31 selects a specific element m from the correlation values input from the correlation detection unit 22, and performs detection of errors and calculation of correction values for all K subchannels corresponding to the element m.

First, regarding the estimation of the amplitude error $\Delta_{mn}$, when a ratio is calculated from the autocorrelation of the element n and the cross-correlation of the element m and the element n, the following formula (9) is obtained.

[Formula 9]

$$\frac{|X_m X_n^*|}{|X_n X_n^*|} = \frac{A_m}{A_n} \times \Delta_{mn} \quad (9)$$

$A_m$ and $A_n$ can be estimated in advance as the reception characteristics of the receiving antenna elements m and n with respect to the position of the calibration ground station 51, and, by removing the term $\Delta_{0mn}$ indicated in formula (10) including these from formula (9) by division, $\Delta_{mn}$ can be calculated as indicated in formula (11).

[Formula 10]

$$\Delta_{0mn} = \frac{A_m}{A_n} \quad (10)$$

[Formula 11]

$$\frac{|X_m X_n^*|}{|X_n X_n^*|} \div \Delta_{0mn} = \Delta_{mn} \quad (11)$$

Regarding the delay error and the phase error, when a phase of a cross-correlation value is extracted, the following formula (12) is obtained.

[Formula 12]

$$\text{Arg}(X_m X_n^*) = 2\pi(\tau_m - \tau_n + \tau_{mn})k\alpha f_{ch} + (\phi_m - \phi_n + \phi_{mn}) \quad (12)$$

$\tau_m$, $\tau_n$, $\varphi_m$, and $\varphi_n$ can be estimated as the reception characteristics of the receiving antenna elements m and n with respect to the position of the calibration ground station 51, and, by removing the term $\tau_{0mn}$ indicated in formula (13) including these from formula (12) by subtraction, formula (14) is obtained.

[Formula 13]

$$\phi_{0mn} = 2\pi(\tau_m - \tau_n)k\Delta f_{ch} + (\phi_m - \phi_n) \quad (13)$$

[Formula 14]

$$\text{Arg}(X_m X_n^*) - \phi_{0mn} = 2\pi\tau_{mn}k\Delta f_{ch} + \phi_{mn} \quad (14)$$

Figure 2:
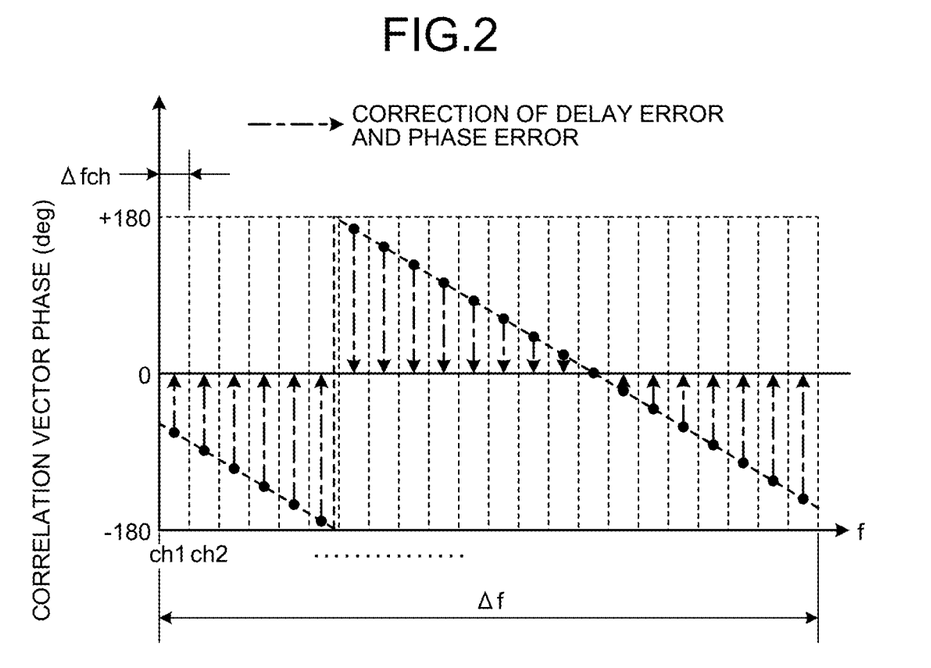
FIG. 2 is a diagram illustrating an example of a correlation vector phase.

A correlation vector phase after removal of $\varphi_{0mn}$ can be expressed as in FIG. 2. FIG. 2 is a diagram illustrating an example of a correlation vector phase. In FIG. 2, the horizontal axis represents the frequency of a received signal, that is, subchannels. The vertical axis represents the correlation vector phase indicated by formula (14), that is, the correlation vector phase after removal of $\varphi_{0mn}$. As can be seen from FIG. 2 and formula (14), the delay error $\tau_{mn}$ appears as a constant inclination amount (phase rotation) with respect to the subchannel k, and the phase error $\varphi_{mn}$ appears as an offset amount.

Since the errors between the element systems generated inside the satellite receiver 1 can be described by formula (8), the correction coefficients thereof are indicated by the following formula (15) using values that can be calculated from formulas (11) and (14). By using the correction coefficient indicated by formula (15), the amplitude error, the delay error, and the phase error can be corrected using the element n as reference for each subchannel of the element m.

[Formula 15]

$$\frac{1}{\Delta_{mn}} e^{-j\delta_{mn}} = \frac{1}{\Delta_{mn}} \exp(-2\pi j\tau_{mn}k\Delta f_{ch} - j\phi_{mn}) \quad (15)$$

Formula (15) is the reciprocal of formula (8). The correction of the delay error and the phase error can be expressed as in FIG. 2.

The inter-element-system error detection unit 31 calculates the correction coefficient indicated by formula (15) for each of N−1 elements other than the element n as reference, and stores the correction coefficients in the correction coefficient storage unit 32.

Corrected excitation coefficients are generated by multiplying the correction coefficients stored in the correction coefficient storage unit 32 and the beam-formation excitation coefficient stored in the excitation coefficient storage unit 33 together by the complex multipliers 34a to 34d. By the excitation coefficient multiplication units 21a to 21d multiplying input signals (subchannels) by the corrected excitation coefficients, desired reception characteristics that are not affected by errors between the element systems of each of the subchannels are achieved.

As described above, $\Delta_{0mn}$ and $\varphi_{0mn}$ used in the calculation indicated in the above formula (11) and the calculation indicated in the above formula (14) are amounts determined by the reception characteristics of the receiving antenna elements m and n with respect to the position of the calibration ground station 51. These amounts are calculated by the ground satellite control station 52 on the basis of position information on the calibration ground station 51 and reception characteristic information on the receiving antenna elements 11a to 11d, transmitted by the command signal 53, received by the TTC transmitting/receiving antenna 54, and then can be given to the inter-element-system error detection unit 31 via the TTC processing unit 55.

Furthermore, in calculating the correction coefficients, it is also possible that correction with respect to $\Delta_{0mn}$ and $\varphi_{0mn}$ are added in advance to the beam-formation excitation coefficient set by the command signal 53 from the ground satellite control station 52 without performing, by the inter-element-system error detection unit 31, division by $\Delta_{0mn}$ and subtraction of $\varphi_{0mn}$ as indicated by formulas (11) and (14). In that case, the correction coefficients are indicated by formula (16), and the excitation coefficients stored in the excitation coefficient storage unit 33 are indicated by formula (17).

[Formula 16]

$$\frac{\Delta_{0mn}}{\Delta_{mn}} e^{-j(\delta_{mn} + \phi_{0mn})} \quad (16)$$

[Formula 17]

$$\frac{G_m}{\Delta_{0mn}} e^{j(\psi_m + \phi_{0mn})} \quad (17)$$

Figure 3:
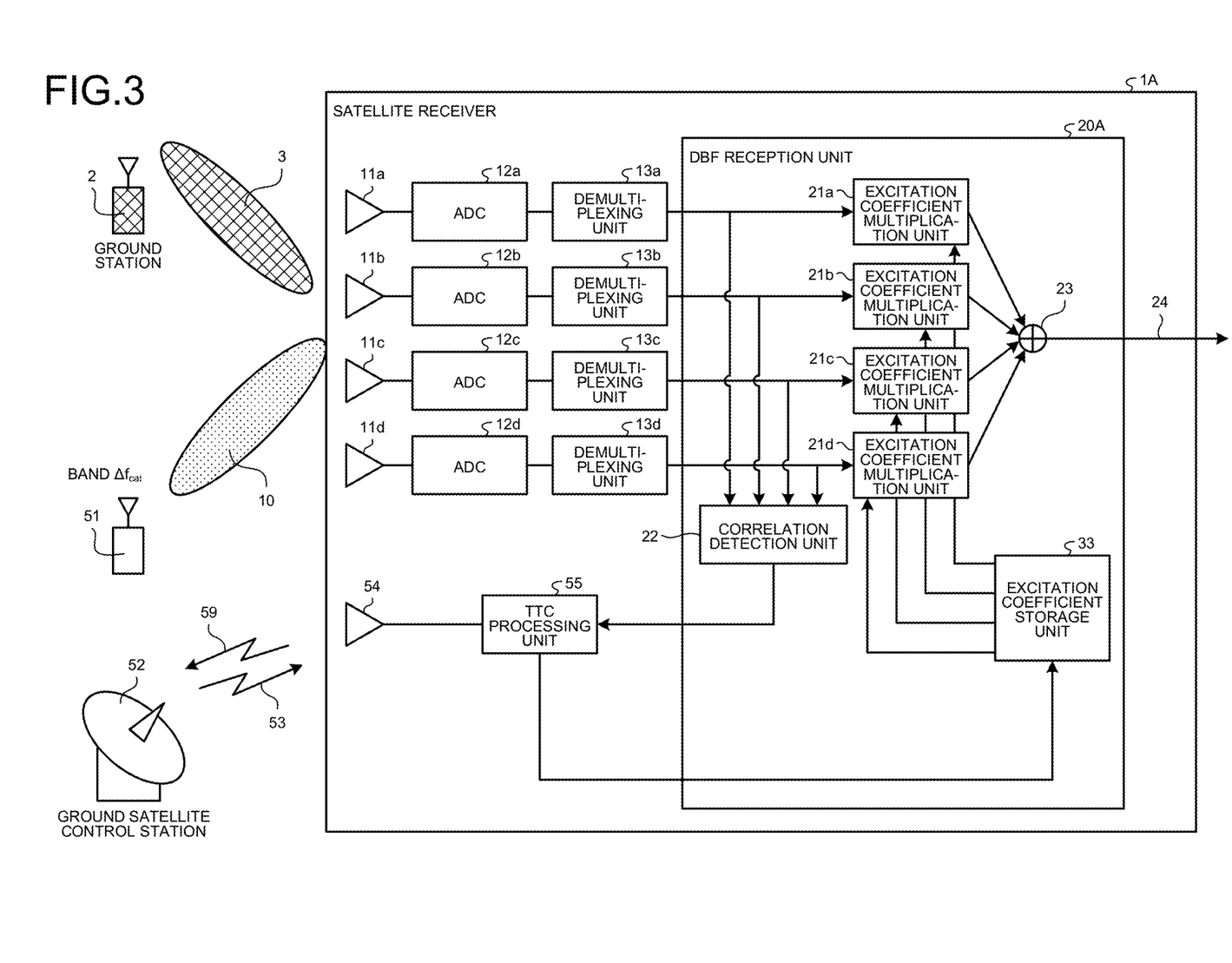
FIG. 3 is a diagram illustrating another example configuration of a satellite receiver according to the first embodiment.

Alternatively, in calculating the correction coefficients, it is also possible to calculate the correction coefficients in the ground satellite control station 52 instead of calculating the correction coefficients inside the satellite receiver 1. That is, a satellite receiver 1A configured as illustrated in FIG. 3 can be employed. FIG. 3 is a diagram illustrating another example configuration of a satellite receiver according to the first embodiment.

The satellite receiver 1A illustrated in FIG. 3 has a configuration obtained by replacing the DBF reception unit 20 of the satellite receiver 1 illustrated in FIG. 1 with a DBF reception unit 20A. The DBF reception unit 20A includes the excitation coefficient multiplication units 21a to 21d, the correlation detection unit 22, the complex adder 23, and the excitation coefficient storage unit 33. These components are the same as the components denoted by the same reference numerals of the DBF reception unit 20 included in the satellite receiver 1.

The satellite receiver 1A transmits the cross-correlation values detected by the correlation detection unit 22 to the ground satellite control station 52 through the TTC processing unit 55 and the TTC transmitting/receiving antenna 54 via a telemetry signal 59. The ground satellite control station 52 calculates correction coefficients by performing a process similar to that of the inter-element-system error detection unit 31 of the DBF reception unit 20 included in the satellite receiver 1, and calculates corrected excitation coefficients by multiplying the beam-formation excitation coefficient by the correction coefficients. The ground satellite control station 52 transmits the calculated corrected excitation coefficients to the satellite receiver 1A via the command signal 53. After receiving the command signal 53 from the ground satellite control station 52 by the TTC transmitting/receiving antenna 54, the satellite receiver 1A stores the corrected excitation coefficients included in the command signal 53 in the excitation coefficient storage unit 33 via the TTC processing unit 55. The excitation coefficient multiplication units 21a to 21d multiply the input signals by the corrected excitation coefficients stored in the excitation coefficient storage unit 33.

Figure 4:
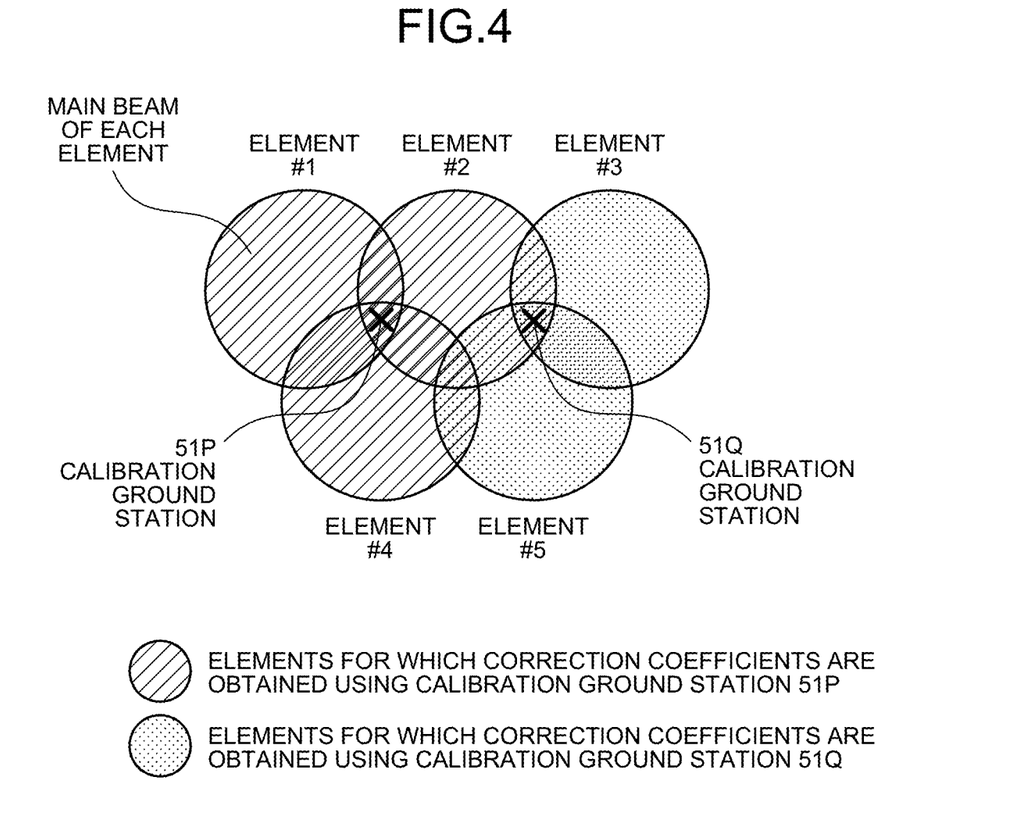
FIG. 4 is a diagram illustrating an example arrangement of each calibration ground station in a case where a plurality of calibration ground stations are provided.

In the above description, the calibration signal 10 of one calibration ground station 51 is input to all the N elements, but depending on the design of the receiving antenna elements 11a to 11d, the calibration signal 10 cannot be input from one calibration ground station 51 to all the N elements in some cases. In that case, it is only required to provide a plurality of calibration ground stations. For example, each calibration ground station is arranged as illustrated in FIG. 4. FIG. 4 is a diagram illustrating an example arrangement of each calibration ground station in a case where a plurality of calibration ground stations are provided. In the example illustrated in FIG. 4, the calibration ground stations 51P and 51Q are prepared in order to calibrate five elements of element #1 to element #5. The calibration ground station 51P is a calibration ground station for calibrating element #2 and element #4 using element #1 as reference, and is arranged at a point of overlapping of main beams of element #1, element #2, and element #4 having high gain as reception characteristics so that a sufficient signal/noise (S/N) ratio can be obtained in correlation calculation. Similarly, the calibration ground station 51Q is a calibration ground station for calibrating element #3 and element #5 using element #2 as reference, and is arranged at a point of overlapping of main beams of element #2, element #3, and element #5 having high gain as reception characteristics so that a sufficient S/N ratio can be obtained in correlation calculation.

In that case, the DBF reception unit 20 of the satellite receiver 1 first uses the calibration ground station 51P to calibrate element #2 and element #4 using element #1 as reference, and then uses the calibration ground station 51Q to calibrate element #3 and element #5 using element #2 as reference. Although the element used as reference is different between the calibration using the calibration ground station 51P and the calibration using the calibration ground station 51Q, it is satisfactory if at least one element is shared as the arrangement of the calibration ground stations. In the example illustrated in FIG. 4, element #2 is shared by calibration by the calibration ground station 51P and calibration by the calibration ground station 51Q. Therefore, although element #3 and element #5 are calibrated using element #2 as reference, the correction coefficient of element #2 with respect to element #1 has been calculated, and consequently, the correction coefficients of element #3 and element #5 using element #1 as reference can be calculated by adding the correction coefficients of element #3 and element #5 using element #2 as reference and the correction coefficient of element #2 using element #1 as reference together. Even in a case where the number of elements increases, calibration using the same reference element can be performed for all the elements by arranging a calibration ground station by a similar method.

According to the present calibration method and configuration, the phase correction value can be given to all the subchannel signals band-divided in the frequency domain, and the delay error and the phase error can be corrected over the entire band regardless of the total band Δf. Regarding the correction of the delay error, in a case of real-time correction by delay line, since the residual delay error after the delay correction appears as continuous phase rotation over the total band Δf, a large phase error occurs at a frequency away from the frequency as reference for correction, which causes intersymbol interference. According to the present calibration method, this phase rotation is confined within a band of one subchannel, and interference can be reduced. Consequently, it is desirable that the bandwidth $\Delta f_{ch}$ of one subchannel can be narrowed as much as possible.

The satellite receiver 1 according to the first embodiment described above achieves the following effects as compared with a conventional satellite communication system such as the satellite communication system described in Patent Literature 1.

The satellite receiver 1 achieves an effect that it is possible to detect and correct errors between the element systems inside the satellite receiver 1 separately from the gain, delay, and phase differences based on the position of the calibration ground station 51 and the reception characteristics of the receiving antenna elements 11a to 11d, and to improve communication efficiency. In addition, the satellite receiver 1 achieves an effect that it is possible to reduce interference due to a delay between the element systems with respect to a broadband communication signal, and to further improve the communication efficiency. Furthermore, the satellite receiver 1 achieves an effect that it is possible to minimize devices related to calibration among devices to be installed on the satellite.

Second Embodiment

Figure 5:
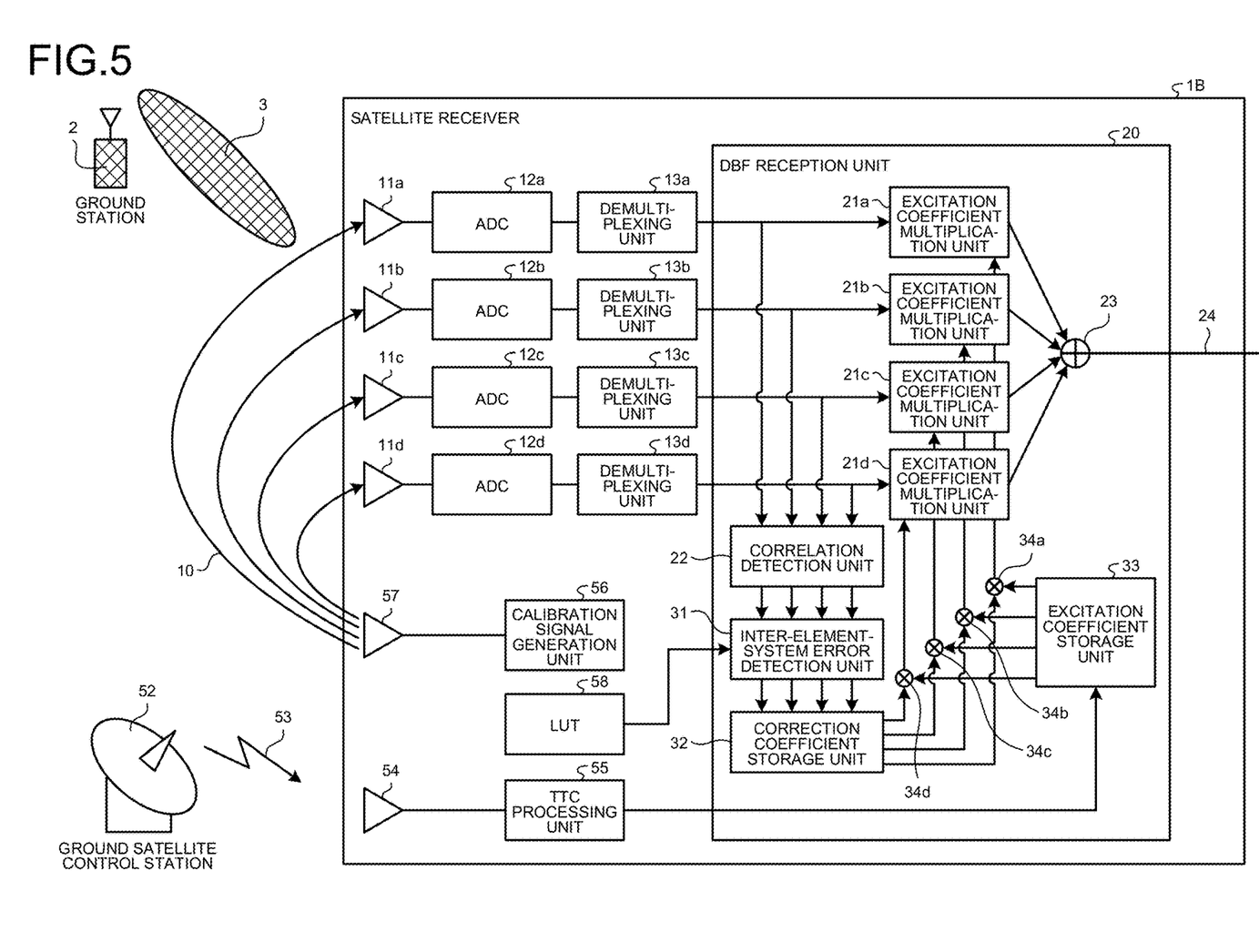
FIG. 5 is a diagram illustrating an example configuration of a satellite receiver according to a second embodiment.

FIG. 5 is a diagram illustrating an example configuration of a satellite receiver 1B according to a second embodiment. The satellite receiver 1B has a configuration obtained by adding, to the satellite receiver 1 according to the first embodiment illustrated in FIG. 1, a calibration signal generation unit 56 that generates a calibration signal, a calibration signal transmitting antenna 57, and a look up table (LUT) 58 that stores coupling characteristics between the calibration signal transmitting antenna 57 and the receiving antenna elements 11a to 11d. Since the other components of the satellite receiver 1B are the same as the components denoted by the same reference numerals of the satellite receiver 1, detailed description thereof will be omitted.

While the satellite receiver 1 according to the first embodiment detects errors between the element systems using the calibration signal 10 transmitted by the calibration ground station 51 and calculates a correction coefficient for correcting a beam-formation excitation coefficient, the satellite receiver 1B according to the second embodiment performs a similar process using the calibration signal 10 generated by the calibration signal generation unit 56 provided inside thereof. In order to avoid interference with a communication signal, calibration using the calibration signal generated by the calibration signal generation unit 56 is performed at a time when communication via the actual communication signal 3 is not performed.

A calibration process performed by the satellite receiver 1B will be described. The calibration signal generated by the calibration signal generation unit 56 and transmitted from the calibration signal transmitting antenna 57 is input to the receiving antenna elements 11a to 11d. The reception characteristics (gain and phase) at that time are based on pass characteristics (gain and phase) from the calibration signal transmitting antenna 57 to the receiving antenna elements 11a to 11d, and are different for each element.

In the satellite receiver 1B, the ADCs 12a to 12d and the demultiplexing units 13a to 13d digitally convert the calibration signal transmitted from the calibration signal transmitting antenna 57 and demultiplex the calibration signal into subchannels, and then the correlation detection unit 22 calculates a cross-correlation value of each subchannel. The correlation detection unit 22 outputs the calculated cross-correlation values to the inter-element-system error detection unit 31.

Similarly to the inter-element-system error detection unit 31 of the satellite receiver 1 according to the first embodiment, the inter-element-system error detection unit 31 calculates a gain error, a delay error, and a phase error between the element systems on the basis of the input cross-correlation values. At that time, it is necessary to separate the pass characteristics (gain and phase) from the calibration signal transmitting antenna 57 to the receiving antenna elements 11a to 11d from the gain error, the delay error, and the phase error between the element systems generated inside the satellite receiver 1B.

The pass characteristics from the calibration signal transmitting antenna 57 to the receiving antenna elements 11a to 11d are determined by the arrangement of the calibration signal transmitting antenna 57 and the receiving antenna elements 11a to 11d, and can be estimated in advance at design. Alternatively, the pass characteristics can be obtained by measurement before the satellite is launched. The amount thereof is obtained in advance for each subchannel of each element and stored in the LUT 58.

The inter-element-system error detection unit 31 of the satellite receiver 1 according to the first embodiment calculates the correction coefficient by removing $\Delta_{0mn}$ and $\varphi_{0mn}$ estimated from the reception characteristics of the respective receiving antenna elements m and n with respect to the position of the calibration ground station 51 from the correlation values, and the inter-element-system error detection unit 31 of the satellite receiver 1B also calculates the correction coefficient by a similar method. At that time, the inter-element-system error detection unit 31 of the satellite receiver 1B removes $\Delta_{0mn}$ and $\varphi_{0mn}$ estimated from the pass characteristics from the calibration signal transmitting antenna 57 to the receiving antenna elements 11a to 11d from the correlation values.

If the pass characteristics from the calibration signal transmitting antenna 57 to the receiving antenna element m can be described as formula (18), the inter-element-system error detection unit 31 can calculate the correction coefficient by setting $\Delta_{0mn}$ and $\varphi_{0mn}$ as indicated in formulas (19) and (20).

[Formula 18]

$$S_m = Z_m e^{j\xi_m} \quad (18)$$

[Formula 19]

$$\varphi_{0mn} = \xi_m \quad (19)$$

[Formula 20]

$$\Delta_{0mn} = Z_m \quad (20)$$

After calculating the correction coefficients for the gain difference, the delay difference, and the phase difference between the element systems, the inter-element-system error detection unit 31 stores the correction coefficients in the correction coefficient storage unit 32.

In general, the pass characteristics from the calibration signal transmitting antenna 57 to the receiving antenna elements 11a to 11d have a small gain, and become more noticeable as a distance between two antennas increases. Therefore, in a case where the cross-correlation value cannot be obtained with a sufficient S/N ratio, a method of providing a plurality of calibration signal transmitting antennas 57 is considered. In that case, as described in the first embodiment with reference to FIG. 4, calibration can be performed for all elements by making it possible to share at least one receiving antenna element between different calibration signal transmitting antennas. Alternatively, by directly estimating and using pass characteristics between the plurality of calibration signal transmitting antennas, pass characteristics using the same calibration signal transmitting antenna as reference may be calculated for all the receiving antenna elements.

The satellite receiver 1B according to the second embodiment achieves the following effects as compared with a conventional satellite communication system such as the satellite communication system described in Patent Literature 1.

The satellite receiver 1B achieves an effect similar to that of the satellite receiver 1 according to the first embodiment, specifically, an effect that it is possible to detect and correct errors between the element systems inside the satellite receiver 1B separately from the gain, delay, and phase differences based on the position of the calibration ground station 51 and the reception characteristics of the receiving antenna elements 11a to 11d, and to improve communication efficiency. In addition, the satellite receiver 1B achieves an effect that it is possible to reduce interference due to a delay between the element systems with respect to a broadband communication signal, and to further improve the communication efficiency. Furthermore, since the satellite receiver 1B can perform closed calibration in the satellite and does not require a calibration ground station, the operation thereof is facilitated.

The configurations described in the embodiments above are merely examples of the content of the present disclosure and can be combined with other known technology and part thereof can be omitted or modified without departing from the gist of the present disclosure.

REFERENCE SIGNS LIST

1, 1A, 1B satellite receiver; 2 ground station; 3 actual communication signal; 10 calibration signal; 11a to 11d receiving antenna element; 12*a* to 12*d* analog-to-digital converter (ADC); 13*a* to 13*d* demultiplexing unit; 20, 20A DBF reception unit; 21*a* to 21*d* excitation coefficient multiplication unit; 22 correlation detection unit; 23 complex adder; 31 inter-element-system error detection unit; 32 correction coefficient storage unit; 33 excitation coefficient storage unit; 34*a* to 34*d* complex multiplier; 51 calibration ground station; 52 ground satellite control station; 53 command signal; 54 TTC transmitting/receiving antenna; 55 TTC processing unit; 56 calibration signal generation unit; 57 calibration signal transmitting antenna; 58 LUT; 59 telemetry signal.

The invention claimed is:

1. A satellite receiver comprising:
   N demultiplexers to each demultiplex, into a plurality of subchannel signals of a predetermined band, a digital reception signal obtained by converting a calibration signal received by a corresponding one of N receiving antenna elements into a digital signal;
   N excitation coefficient multipliers to multiply each of the plurality of subchannel signals by an excitation coefficient;
   a complex adder to add the plurality of subchannel signals that are multiplied by the excitation coefficient together for each subchannel signal of a same band;
   a correlation detector to, with use of one demultiplexer among the N demultiplexers as a reference demultiplexer, calculate a cross-correlation value for each subchannel signal output from each demultiplexer different from the reference demultiplexer with respect to a subchannel signal of a same band output from the reference demultiplexer; and
   an excitation coefficient generator to generate a corrected excitation coefficient that is an excitation coefficient by which the excitation coefficient multipliers multiply the subchannel signals, on a basis of a cross-correlation value calculated by the correlation detector and an excitation coefficient created in advance to form a desired reception beam, wherein
   the excitation coefficient generator includes:
   an inter-element-system error detector to calculate, on a basis of the cross-correlation value, a correction coefficient for correcting an error based on a hardware characteristic of the satellite receiver, the error being included in each of a plurality of subchannel signals obtained by a demultiplexing process performed by each of the N demultiplexers; and
   a multiplier to generate the corrected excitation coefficient by multiplying, by the correction coefficient, the excitation coefficient created in advance to form the desired reception beam, and
   the N is an integer of 2 or more.

2. The satellite receiver according to claim 1, wherein the inter-element-system error detector calculates the correction coefficient on a basis of the cross-correlation value and an error in pass characteristics from a transmission source of the calibration signal to each of the N receiving antenna elements.

3. The satellite receiver according to claim 2, further comprising:
   a calibration signal generator to generate the calibration signal; and
   a calibration signal transmitting antenna to transmit the calibration signal.

4. A satellite communication system comprising:
   the satellite receiver according to claim 3.

5. A satellite communication system comprising:
   the satellite receiver according to claim 2.

6. A satellite communication system comprising:
   the satellite receiver according to claim 2; and
   a calibration ground station to transmit the calibration signal.

7. The satellite communication system according to claim 6, wherein
   the calibration ground station is arranged at a location where a gain equal to or larger than a predetermined value is obtained with a plurality of the receiving antenna elements.

8. The satellite communication system according to claim 7, wherein
   each of a plurality of the calibration ground stations is arranged at a location where a gain equal to or larger than a predetermined value is obtained with at least two of the receiving antenna elements, and receiving antenna elements to receive calibration signals each transmitted from one of the plurality of the calibration ground stations include a receiving antenna element to receive calibration signals from two or more calibration ground stations.

9. The satellite communication system according to claim 6, wherein
   each of a plurality of the calibration ground stations is arranged at a location where a gain equal to or larger than a predetermined value is obtained with at least two of the receiving antenna elements, and receiving antenna elements to receive calibration signals each transmitted from one of the plurality of the calibration ground stations include a receiving antenna element to receive calibration signals from two or more calibration ground stations.

10. The satellite receiver according to claim 1, further comprising:
    a calibration signal generator to generate the calibration signal; and
    a calibration signal transmitting antenna to transmit the calibration signal.

11. A satellite communication system comprising:
    the satellite receiver according to claim 10.

12. A satellite communication system comprising:
    the satellite receiver according to claim 1.

13. A satellite communication system comprising:
    the satellite receiver according to claim 1; and
    a calibration ground station to transmit the calibration signal.

14. The satellite communication system according to claim 13, wherein
    the calibration ground station is arranged at a location where a gain equal to or larger than a predetermined value is obtained with a plurality of the receiving antenna elements.

15. The satellite communication system according to claim 14, wherein
    each of a plurality of the calibration ground stations is arranged at a location where a gain equal to or larger than a predetermined value is obtained with at least two of the receiving antenna elements, and receiving antenna elements to receive calibration signals each transmitted from one of the plurality of the calibration ground stations include a receiving antenna element to receive calibration signals from two or more calibration ground stations.

16. The satellite communication system according to claim 13, wherein
  each of a plurality of the calibration ground stations is arranged at a location where a gain equal to or larger than a predetermined value is obtained with at least two of the receiving antenna elements, and receiving antenna elements to receive calibration signals each transmitted from one of the plurality of the calibration ground stations include a receiving antenna element to receive calibration signals from two or more calibration ground stations.

* * * * *